United States Patent

[11] 3,544,731

[72] Inventor Michael C. J. Cowpland
Ottawa, Ontario, Canada

[21] Appl. No. 809,632

[22] Filed March 24, 1969

[45] Patented Dec. 1, 1970

[73] Assignee Northern Electric Company Limited
Montreal, Quebec, Canada

[54] PUSHBUTTON DIAL TELEPHONE SET
4 Claims, 1 Drawing Fig.

[52] U.S. Cl. ........................ 179/84

[51] Int. Cl. ........................ H04m 1/50, H04m 1/00

[50] Field of Search ........................ 179/84(UF), 81

[56] References Cited

UNITED STATES PATENTS 3,431,366 3/1969 Rodek ........................ 179/84(UF)

3,447,096 5/1969 Fischer et al. ........................ 179/84(UF)

*Primary Examiner*—Kathleen H. Claffy
*Assistant Examiner*—William A. Helvestine
*Attorney*—Curphey and Erickson

ABSTRACT: A simple electronic switch is used to directly replace a corresponding mechanical common switch in a pushbutton dial telephone set. And, the conventional circuit associated with the telephone set is modified by the addition of a single resistor in a novel manner so as to provide a control voltage source which is used in conjunction with the pushbuttons to trigger the electronic switch.

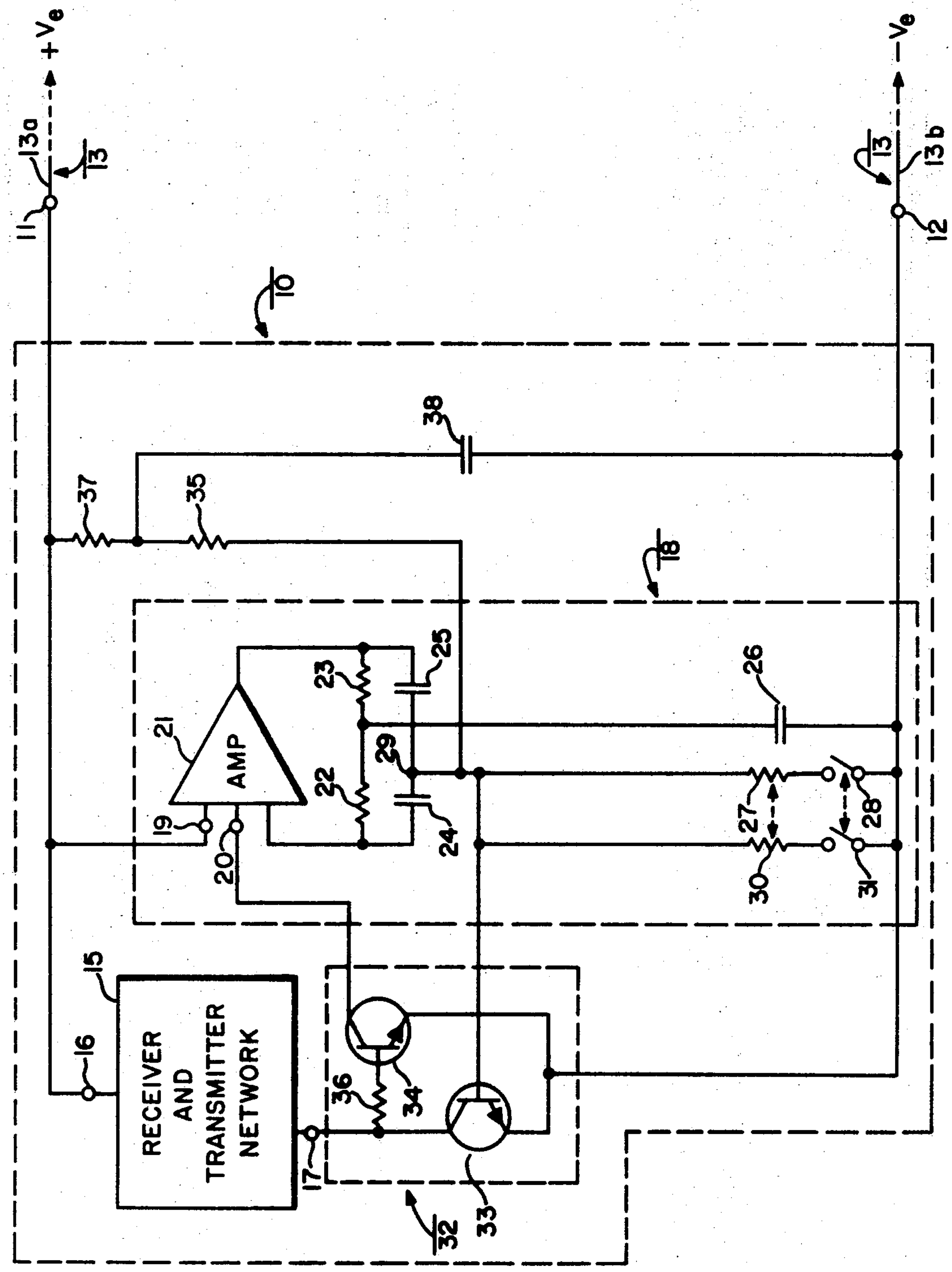
INVENTOR
MICHAEL C. J. COWPLAND
BY Curphey & Erickson
PATENT AGENTS

PUSHBUTTON DIAL TELEPHONE SET

This invention relates to electronic switch circuits and more particularly to such circuits which are used in pushbutton dial telephones.

In pushbutton dial telephones, it has been observed that the dial has a relatively high incidence of failure. The majority of the failures appear to occur in a mechanical common switch mechanism, the problem being that a pair of contacts within the switch do not always operate when any one of the pushbuttons are depressed, as say when dialling a number. Presently, the pushbutton dial assembly is a mechanically complex system of levers, cams, and sliding bars which are required to mechanically link the common switch contacts to each pushbutton switch. Thus, the common switch contacts will operate whenever any one pushbutton switch is operated. But, it has been observed that the failure of the common switch contacts to operate occurs as a result of an occasional sticking condition in the mechanical linkage system.

The elimination of the common switch in its present form would appear to be highly desirable since to do so would remove the source of difficulty. In respect to the novelty of the invention to be described herein, it is perhaps significant that even though the problems associated with the mechanical common switch are well known, it has apparently not as yet been significantly improved at this point of development in the pushbutton dial telephone art. One conclusion to be drawn from this observation is that the benefits to be derived do not warrant a change in the pushbutton dial structure. However, a more logical conclusion is that the telephone art is inadequate on this particular point since it is known that such benefits are both real and worth seeking. For example, it is self-evident that if the mechanical common switch structure could be done away with, a considerably more simple pushbutton switch mechanism could be used to perform the required signalling functions. Elimination of the mechanical linkages coupling each pushbutton to the common switch would also considerably simplify the manufacture of the pushbutton dial assembly.

One obvious solution to the problem of common switch failure is to substitute an equivalent electronic common switch for that of the mechanical common switch. In this approach the mechanical linkage system between the individual pushbuttons and the common switch is avoided by making the equivalent electronic common switch electrically responsive to the operation of any one pushbutton switch. There is, however, a foreseeable difficulty here in that the pushbutton switch circuitry is not connected to a source of voltage until the common switch functions. Thus, a situation would exist where a control voltage is not available from any one of the pushbutton switches until the common switch functions. And, an electrical common switch would not function until triggered by such a control voltage. A solution to this problem is available, but only at the expense of extra electrical components to construct a network which would be connected to the pushbutton switches in order that they may generate control voltages independently of the operation of the common switch. It is therefore apparent that the mechanical common switch cannot readily be replaced merely by substituting an equivalent electronic switch. The use of an electronic switch would carry with it an attendant problem of expense which would come about through the cost of the extra components required to provide a source of control voltage for the pushbutton switches.

By means of the invention herein disclosed, the problem of a high failure rate in the common switch of a pushbutton dial telephone set is overcome and at the same time advantages of manufacturing economy and further equipment reliability are introduced. A simple electronic switch is used to directly replace the corresponding mechanical switch in the pushbutton telephone set. In addition, the circuit associated with the pushbutton telephone set is modified in a novel manner so as to provide a control voltage source which in conjunction with the pushbuttons is used to trigger the electronic switch. As a result of the electronic common switch substitution, considerably improved reliability and life-span is bestowed upon the telephone set. All of these advantages are realized by the fact that the attendant circuitry required to cause the electronic switch to function in a predetermined way is provided by the addition of only one simple and reliable electrical component connected into the circuit in a novel manner.

The invention herein disclosed is a pushbutton dial telephone set having first and second terminals for connection to a telephone line which has a source of operating voltage impressed thereacross. The pushbutton dial telephone set comprises: a receiver and transmitter network which is connected in series with a first switching means between the first and second terminals. Further included is a tone oscillator circuit having common signal output and voltage supply terminals connected in series with a second switching means between the first and second terminals, the second switching means being responsive to the first switching means whereby the second switching means is closed when the first is opened and vice versa. The tone oscillator circuit also includes a feedback network having a plurality of frequency control resistors. A current limiting resistor is connected in series with a pair of control terminals of the first switching means between the first and second terminals so that the source of operating voltage results in a control voltage across the control terminals which closes the first switching means. One end of each of the plurality of frequency control resistors is connected to the junction of the current limiting resistor and one of the control terminals. And, a means is included for connecting the other end of any one of the frequency control resistors to the second terminal so as to cause the oscillator to oscillate at a predetermined frequency and so as to shunt the control terminals which decreases the control voltage so that the first switching means opens and the second switching means closes.

One circuit embodiment of the principle of the invention herein disclosed will be fully understood from the following detailed description taken in connection with the appended drawing in which the FIG. is a schematic and block diagram of an improved pushbutton dial telephone set.

Reference to the FIG. shows a pushbutton dial telephone set 10 having a first terminal 11 and a second terminal 12, both of which are connected to a telephone line 13. The telephone line 13 is shown comprising wires **13*b* and 13*b* which are connected respectively to the terminals 11 and 12. It will be noted that an operating voltage is impressed across the telephone line 13** and is depicted in the FIG. as $+V_e$ and $-V_e$.

The overall structure of the pushbutton telephone set 10 comprises three substructures which are interconnected to form an operational pushbutton dial telephone set. The substructures referred to are:

a. a receiver and transmitter network 15 having a third terminal 16 and a fourth terminal 17 for connection across the telephone line 13. The network 15 is a known telephone circuit used to receive and reproduce incoming signals from the telephone line and to generate and transmit such electrical signals;

b. an oscillator circuit 18 having a fifth terminal 19 and a sixth terminal 20 for connection across the telephone line 13. The structure of the oscillator circuit 18 is known in the telephone art where it is used to generate dial signals in the form of tones of various frequencies which are used for signalling purposes. The oscillator circuit 18 comprises an amplifier 21 and a twin-T feedback network operably connected thereto. The said network consists in part of two serially connected resistors 22 and 23 in parallel with two serial serially connected capacitors 24 and 25 that are serially connected between the signal input and output points of the amplifier 21. The said feedback network further includes a capacitor 26 which is connected between the junction of the serially connected resistors 22 and 23 and the second terminal 12. From a junction 29, a frequency control resistor 27 and a pushbutton switch 28 are serially connected to the second terminal 12. Likewise connected between the junction 29 and the second terminal 12 are a frequency control resistor 30 and a pushbutton switch 31. The dashed lines between the control resistors 27 and 30, and the dashed lines between the pushbutton switches 28 and 31 are to indicate a plurality of such components in keeping with the requirements of a standard pushbutton dial telephone set. The dashed lines thus simplify the FIG. It should be noted that the oscillator circuit 18 is shown in a simplified manner. In practice, two oscillator circuits, having the same circuit configuration of the oscillator circuit 18, are connected in parallel. Each oscillator may generate one of four optional signals which are selected by means of one of the pushbutton switches. The circuit structure is arranged so that when any one pushbutton is operated, both oscillator circuits function to produce two simultaneous signals;

c. an electronic switch 32 comprising a first transistor 33 having its emitter connected to the second terminal 12, its base connected to the junction 29, and its collector connected to the fourth terminal 17, and a second transistor 34 having its emitter also connected to the second terminal 12, but its base connected through a base resistor 36 to the fourth terminal 17 and its collector connected to the sixth terminal 20;

d. a current limiting resistor 35 which is serially connected with a decoupling resistor 37 between the junction 29 and the first terminal 11, and a decoupling capacitor 38 connected between the junction point of the resistors 35 and 37 and the terminal 12. The junction of the resistor 37 and the capacitor 38 is representative of a direct current voltage source that is obtained from the operating voltage and which is available in a pushbutton dial telephone set. While not shown, the set 10 would also include a hook switch connected in series with the line and a ringer connected in parallel with the line, both being of conventional design.

A specific embodiment of the invention as represented in the FIG. will be best understood by considering the operation of the pushbutton dial telephone set 10. For purposes of explanation, it is convenient to first examine the condition which the receiver and transmitter network 15 is connected across the telephone line 13 to either receive or generate voice telephone signals. In this operating mode, one side of the oscillator circuit 18 is disconnected from the telephone line 13. It will be noted in the drawing, that one side of the receiver and transmitter network 15 is connected directly to the wire **13*a* through the third terminal 16 and the first terminal 11. And, the other side of the network 15 is connected from the fourth terminal 17, through the electronic switch 32 to the second terminal 12 and therefrom to the wire 13*b*. Similarly, the oscillator circuit 18 has a direct connection to one side of the telephone line 13 from the fifth terminal 19, through the first terminal 11 and therefrom to the wire 13*a*. And, the other side of the oscillator circuit 18 is connected to the other side of the telephone line from the sixth terminal 20, through the electronic switch 32, to the second terminal 12, and therefrom to the wire 13*b*. It is apparent, therefore, that the receiver and transmitter network 15, or the oscillator circuit 18, may be connected directly across the telephone line 13 or disconnected therefrom through the action of the electronic switch 32**.

The operation of the electronic switch 32 will be next described. The +Ve operating voltage source is applied to the base of the first transistor 33 through the current limiting resistor 35 and the resistor 37 which are serially connected between the base and the first terminal 11. Accordingly, the first transistor 33 will become forward-biased and will act as a closed switch to connect the fourth terminal 17 to the second terminal 12. Furthermore, as a result of the interconnection of the transistors 33 and 34, whenever the first transistor 33 is forward-biased, the second transistor 34 becomes unbiased and is thereby kept in an open switch condition which disconnects the sixth terminal 20 from the second terminal 12. Thus, the oscillator circuit 18 is disconnected from the wire **13*b* whereas the receiver and transmitter network 15 is connected to the wire 13*b***.

The preceding description shows how the receiver and transmitter network 15 is connected across the telephone line 13, and how the oscillator circuit 18 is disconnected therefrom, such connection and disconnection occuring as a result of the operation of the electronic switch 32. In this manner, the receiver and transmitter network 15 is connected across the telephone line 13 and will be energized by the operating voltage connected thereacross so that it may function according to its design parameters.

For a complete understanding of the operation of the invention herein described and exemplified in the specific embodiment of the pushbutton telephone set shown in the FIG., consideration should be next given to the operation of the telephone set 10 when dial signals are to be generated. In this situation, the receiver and transmitter network 15 is to be disconnected from the wire **13*b* and the oscillator circuit 18 is to be connected thereto. Since it has been described how the receiver and transmitter network 15 is placed into the receive-transmit mode of operation, the remaining description will show how appropriate connections are broken and made in order to connect the oscillator circuit 18 across the telephone line 13 so that tone signals may be sent out thereon. For the present, it has been shown that the receiver and transmitter work network 15 is connected between the first and second terminals 11 and 12 and consequently across the telephone line 13. It has also been explained that as a result of the operation of the electronic switch 32, the first transistor 33 is in a closed switch condition and connects the fourth terminal 17 to the second terminal 12, whereas the second transistor 34 is in an open switch condition and disconnects the sixth terminal 20 of the oscillator circuit 18 from the second terminal 12 and consequently from the telephone line 13. The result is that the operating voltage across the telephone line 13 is disconnected from the amplifier 21 which makes the oscillator network 18** inoperative.

When any one of the pushbutton switches 28 or 31 is operated, during the interval over which the contacts of the switch are closed the receiver and transmitter network 15 will be disconnected from the telephone line 13 whereas the oscillator network 18 will be energizeably connected across the telephone line 13 resulting in an operative oscillator. As an illustrative example, consider that the pushbutton switch 28 is operated and the contacts thereon are closed. This action results in a voltage divider network, consisting of the resistors 27, 35 and 37, being connected between the first and second terminals 11 and 12, and consequently across the wires **13*a* and 13*b*. The total resistance value of the two resistors 35 and 37 is purposely made several times greater than the resistance value of the control resistor 27. As a result, the control voltage developed at the junction 29 is now reduced in a ratio which is proportional to the ratios of the three resistors 27, 35 and 37. Accordingly, the control voltage applied to the base of the first transistor 33 is insufficient to bias that transistor into a forward conducting state. The first transistor 33 is therefore turned off with the result that the second transistor 34 is turned on. Base current from the transistor 34 flows through the base resistor 36 and through the network 15. This current flow would tend to energize the network 15. However, the value of the base resistor 36 is made sufficiently large to keep the base current sufficient to saturate the transistor 34 but insufficient to energize the network 15. The final outcome is that the fourth terminal 17 is disconnected from the wire 13*b* whereas the sixth terminal 20 of the amplifier 21 is connected through the switched on second transistor 34 to the second terminal 12, thereby completing the connection of the oscillator network 18 across the telephone line 13. The function of the decoupling resistor 37 and the decoupling capacitor 38** is to prevent the feedback of tone signals from the telephone line to the twin-T feedback network.

The operation of the circuit as described in the preceding paragraph is exactly the same irrespective of whichever one of the plurality of pushbutton switches is operated. There are some differences in the resistance values of each one of the plurality of the control resistors shown in the FIG. as resistors 27 and 30. This arises from the fact that the frequencies of the several signals generated by the oscillator are responsive to the resistance values of the control resistors. Accordingly, there will be small variations in the control voltage developed at the junction 29. In any event, however, the control voltage developed at the junction 29 under the condition of the operation of any one pushbutton switch is such that the voltage magnitude is insufficient to forward bias the first transistor 33 with the result that this transistor is placed into an open switch condition. Conversely, when the one aforementioned pushbutton switch is released, and its contacts open, the one end of the aforesaid voltage divider circuit is disconnected from the second terminal 12. And, since the resistor 35 is connected through the resistor 37 to the terminal 11, the +Ve operating voltage source from the wire 13*a* is connected to the base of the first transistor 33. As earlier described, this voltage is sufficient to forward bias the first transistor 33 into a closed switch condition which results in the connection of the terminal 17 to the terminal 12. Concurrent with forward biasing the first transistor 33, the second transistor 34 is unbiased and thereby disconnects the sixth terminal 20 from the second terminal 12. Thus, it may be seen that the pushbutton dial telephone set 10 always reverts to a receive-transmit mode of operation each time following a complete operation of any one of the plurality of pushbutton switches.

I claim:

1. A pushbutton dial telephone set having first and second terminals for connection to a telephone line which has a source of operating voltage thereacross, the telephone set comprising:

a receiver and transmitter network connected in series with a first switching means between the first and second terminals;

a tone oscillator circuit, having common signal output and voltage supply terminals connected in series with a second switching means between the first and second terminals, the second switching means being responsive to the first switching means whereby the second switching means is closed when the first is opened and vice versa;

the tone oscillator circuit including a feedback network having a plurality of frequency control resistors;

a current limiting resistor connected in series with a pair of control terminals of the first switching means between the first and second terminals so that the source of operating voltage results in a control voltage across the control terminals which closes the first switching means;

one end of each of the plurality of frequency control resistors being connected to the junction of the current limiting resistor and one of the control terminals;

and means for connecting the other end of any one of the frequency control resistors to the second terminal so as to cause the oscillator to oscillate at a predetermined frequency and so as to shunt the control terminals, which decreases the said control voltage so that the first switching means opens and the second switching means closes.

2. A pushbutton dial telephone set as defined in claim 1, wherein:

the receiver and transmitter network includes third and fourth terminals for connection to the telephone line, the third terminal being connected to the first terminal;

the tone oscillator circuit further having an amplifier with fifth and sixth terminals for connection to the telephone line, the fifth terminal being connected to the first terminal;

the feedback network further including two serially connected resistors connected in parallel with two serially connected capacitors, a shunt capacitor connected between the junction of the two serially connected resistors and the second terminal, and the said one control terminal being connected to the junction of the two serially connected capacitors.

3. A pushbutton dial telephone set as defined in claim 2, wherein: the first and second switching means comprise first and second transistors, the collector of the first transistor being connected to the fourth terminal and through a base resistor to the base of the second transistor, the base of the first transistor being connected to the junction of the two serially connected capacitors, which base is the said one control terminal, the emitters of both transistors being connected to the second terminal, which emitter of the first transistor being the other one of the said pair of control terminals, and the collector of the second transistor being connected to the sixth terminal.

4. A pushbutton dial telephone set as defined in claim 3, wherein: the means for connecting the other end of any one of the frequency control resistors to the second terminal comprises a plurality of normally open pushbutton switches corresponding in number to the frequency control resistors, each of the said switches having first and second contacts, the first contact being connected to the said other end of a corresponding frequency control resistor and the second contact being connected to the second terminal, so that when any one pushbutton switch is closed the oscillator circuit generates a tone signal of a predetermined frequency which is a function of the resistance of the frequency control resistor switched into the tone oscillator circuit.